United States Patent

Ammann et al.

[11] Patent Number: 6,040,777
[45] Date of Patent: Mar. 21, 2000

[54] DEVICE AND PROCESS FOR INDICATING THE EXHAUSTION OF A FILTER

[75] Inventors: Klaus Ammann, Sereetz; Wolfgang Bäther, Lübeck, both of Germany

[73] Assignee: Drager Sicherheitstechnik GmbH, Germany

[21] Appl. No.: 09/321,465

[22] Filed: May 27, 1999

[30] Foreign Application Priority Data

Oct. 28, 1998 [DE] Germany .......................... 198 49 900

[51] Int. Cl.$^7$ ............................................. G08B 21/00
[52] U.S. Cl. ............................ 340/632; 340/607; 95/25; 95/273; 96/18; 96/26
[58] Field of Search ................................. 340/632, 606, 340/607; 95/1, 25, 273; 96/18, 26

[56] References Cited

U.S. PATENT DOCUMENTS

| 4,203,734 | 5/1980 | Winter ................................... 95/115 |
| 4,332,734 | 6/1982 | Hengst et al. ........................ 210/90 |
| 5,080,699 | 1/1992 | Ho et al. ................................ 96/129 |

FOREIGN PATENT DOCUMENTS

| 40 02 843 C1 | 4/1991 | Germany . |
| 44 19 734 C2 | 12/1995 | Germany . |
| 195 43 056 A1 | 5/1997 | Germany . |
| WO 96/12524 | 5/1996 | WIPO . |

OTHER PUBLICATIONS

Gerry O Wood Jan. 1994 Estimating Service Lives of Organic Vapor Cartridges AISA Journal.

*Primary Examiner*—Edward Lefkowitz
*Attorney, Agent, or Firm*—McGlew and Tuttle, P.C.

[57] ABSTRACT

A device and a process for indicating the exhaustion of an adsorption filter to indicate a necessary filter change in time is provided. The monitoring device has a gas concentration-measuring device (8), a temperature-measuring device (9) for determining the temperature of the ambient air, a memory unit (3) with a first memory field (4), in which filter data sets associated with individual filters are stored, with a second memory field (5), in which data specific of toxic substances are stored, and with a third memory field (6), which contains preset values for the ambient air humidity and the respiratory minute volume, as well as an input unit (7) for selecting preset values from the memory fields (4, 5, 6). A timer (10) with a start button (13), which provides an output of the service life t of the adsorption filter is also provided. An evaluating circuit (2) is provided, which determines a remaining capacity of the adsorption filter from the values selected with the input unit (7), the measured toxic substance content in the ambient air, the temperature of the ambient air, and the service life t, and an alarm means (11) for generating a filter exhaustion signal when the remaining capacity is lower than or equal to a preset limit value.

8 Claims, 2 Drawing Sheets

DEVICE AND PROCESS FOR INDICATING THE EXHAUSTION OF A FILTER

FIELD OF THE INVENTION

The present invention relates to devices for determining the exhaustion of adsorption filters as well as processes for determining the exhaustion of adsorption filters and systems for determining the exhaustion of adsorption filters.

BACKGROUND OF THE INVENTION

Gas filter devices protect their user from the inhalation of gases and vapors that are hazardous to health. This protection lasts until the uptake capacity of the adsorption filter is exhausted. The time period from the start of use of the filter insert to the point in time at which relevant concentrations of the components to be separated by the filter appear on the inhalation side is called the breakthrough time or retention time of the adsorption filter. The filter retention time depends on a number of parameters, including, e.g., the type and the amount of the adsorbent contained in the filter, the filter design, the type of the toxic substance, the concentration of the toxic substance, environmental conditions, such as the temperature and the relative humidity, and the respiratory minute volume of the user of the device. To effectively protect the user of the device, the user must be warned by a suitable measuring and warning means in time before the breakthrough of the filter. If this is not possible, it is absolutely necessary to have an idea of the retention time of the adsorption filter used under the conditions of use. To ensure this, either the environmental parameters and the filter parameters must be known, or, if they are not known, they must be estimated for the worst case.

Various procedures have been known for indicating a necessary filter change. Substances that can be noticed from their odor in time can be recognized by the user at the time of breakthrough. Consequently, this odor perception can be used to indicate a necessary filter change. The drawback of the use of such odor perception is that the faculty of perception may be subject to great variations both from one person to the next and depending on the personal health status. Filter breakthrough recognition that is based on odor perception alone is therefore no longer permissible in some countries. In addition, the user of the device should have a certain time available after the indication to leave the hazardous area and to carry out the filter change. This possibility is not given in cases in which warning is generated only after the filter breakthrough.

Even though the drawback of the individual variations and of the variations based on the personal well-being is eliminated if the subjective odor perception is replaced with a sensor system located in the breathing connection, which recognizes and activates a warning, the drawback of the lack of a safety margin in time until the beginning of the breakthrough is not eliminated. This drawback can be eliminated by analyzing the air flowing through the filter bed at a point within the filter bed, e.g., at 80% to 90% of the height of the filter bed. Such a device has been known from WO 96/12524. The drawback of this is that interventions in the filter design are necessary and that the filters become larger and heavier due to the sensor system and the electronic system to be installed.

If none of the above-mentioned possibilities is used to recognize a filter breakthrough, the protection of the user must be guaranteed by developing use guidelines which are specific of the particular workplace and in which the service lives are regulated.

The filter service lives specified by the use guidelines are based, on the one hand, on the determination of the conditions of use and the environmental conditions and, on the other hand, either on measured values, which were obtained with the filters under the conditions of use determined, or on filter retention times theoretically derived for the environmental conditions determined. The drawback of the use of such use guidelines is that the indication of a necessary filter change is not based on the currently occurring conditions, but the worst case was used for the determination of the service life. As a result, the filters are used very insufficiently in most cases.

SUMMARY AND OBJECTS OF THE INVENTION

The primary object of the present invention is to provide a device and a process for the indication of a necessary filter change.

According to one aspect of the invention, a device is provided for determining the exhaustion of an adsorption filter for toxic gases in the ambient air. The device includes a gas concentration-measuring device for determining the toxic substance content in the ambient air. A temperature-measuring device is provided for determining the temperature of the ambient air. A memory unit is provided with a first memory field, in which filter data sets associated with adsorption filters are stored, with a second memory field, in which data sets for the toxic substance to be adsorbed are contained, and with a third memory field, which contains preset values for the ambient air humidity and the respiratory minute volume. An input unit is provided for selecting the preset values from at least the first memory field, the second memory field and the third memory field. A timer with a start button is provided, which shows a service life t of the adsorption filter. An evaluating circuit is provided, which determines the maximum service life $t_{max}$ from the selected preset values, the toxic substance content in the ambient air and the temperature of the ambient air and forms a remaining capacity of the adsorption filter from the difference $t_{max}$ minus t. A device is provided for generating a filter exhaustion indication when the remaining capacity is lower than or equal to a preset limit value.

According to another aspect of the invention a device is provided for determining the exhaustion of an adsorption filter for toxic gases in the ambient air. The device has a gas concentration-measuring device for determining the toxic substance content in the ambient air, a temperature-measuring device for determining the temperature of the ambient air, a humidity-measuring device for determining the relative humidity of the ambient air and a respiratory minute volume-measuring device for determining the volume of ambient air flowing through the adsorption filter per unit of time. The device also has a memory unit with a first memory field, in which filter data sets associated with the adsorption filter are stored, and with a second memory field, in which data sets for the toxic substance to be adsorbed are contained. The device further has an input unit for selecting the preset values from at least the first memory field and the second memory field. A timer is provided with a start button, which shows a service life t of the adsorption filter. An evaluating circuit is provided, which determines a maximum service life $t_{max}$ from the preset values selected with the input unit and from the measured values obtained for the toxic substance content in the ambient air, the temperature and the relative humidity of the ambient air and the respiratory minute volume and forms a remaining capacity of the adsorption filter from the difference $t_{max}$ minus t. The device also has an indicator generating a filter exhaustion indication when the remaining capacity value is lower than or equal to a preset limit value.

According to another aspect of the invention, a process is provided for determining the exhaustion of an adsorption filter with a device containing a gas concentration-measuring device, a temperature-measuring device, a memory unit with a first memory field, in which filter data sets associated with adsorption filters are stored, with a second memory field, in which data sets for the toxic substance to be adsorbed are stored, and with a third memory field, which contains preset values for the ambient air humidity and the respiratory minute volume. The device also has an input unit, a timer with a start button and an evaluating circuit. The process includes the steps of:

a) selection of filter data preset values from the first memory field, of toxic substance data preset values from the second memory field, of an ambient air humidity preset value and of a respiratory minute volume preset value from a third memory field with the input unit;

b) measurement of the toxic substance content in the ambient air with the gas concentration-measuring device and of the temperature of the ambient air with the temperature-measuring device;

c) determination of a maximum service life $t_{max}$ in the evaluating circuit from the selected preset values according to a) and the measured values according to b);

d) starting the timer, which shows the service life t of the adsorption filter, with the start button;

e) formation of remaining capacity of the adsorption filter from the comparison of $t_{max}$ with t, and f) generation of a filter exhaustion indication when the remaining capacity is lower than or equal to a preset limit value.

The advantage of the present invention is essentially that by including the measured concentration of the toxic substance and the currently occurring environmental conditions in the calculation of the uptake capacity of the adsorption filter, the remaining service life can be determined substantially more accurately. The device according to the present invention is arranged separately from the adsorption filter, so that no interventions in the filter design are necessary. The device according to the present invention can thus be used for a plurality of adsorption filters. The device is preferably fastened in the vicinity of the adsorption filter, e.g., on the breast pocket of the user of the device. Toxic substance concentrations and ambient temperatures are thus determined with sufficient accuracy. An even greater increase in the accuracy of the determination of the remaining service life and thus a further improvement in filter use can be achieved by also measuring the relative humidity of the ambient air and the respiratory minute volume of the user of the respirator, in addition to the concentration of the toxic substance and the ambient temperature, and including them in the calculation of the uptake capacity of the adsorption filter.

The process according to the present invention for determining the exhaustion of an adsorption filter consists of transferring preset values for the type of the adsorption filter being used, the toxic substance to be adsorbed, the ambient air humidity and the respiratory minute volume from individual memories of a memory unit into an evaluating circuit by means of an input unit, of measuring the content of the toxic substance and the temperature of the ambient air and of determining a given overall capacity of the filter under the conditions of use from the preset values and the measured values and of determining from this a maximum service life $t_{max}$ of the adsorption filter according to known calculation formulas in the evaluating circuit. By actuating a start button on the monitoring device when the adsorption filter is put into operation, a timer is activated, which shows the service life t of the adsorption filter. By comparing $t_{max}$ with t, the remaining use time or remaining capacity of the adsorption filter is obtained, and it is indicated for the user. Increased accuracy of the calculation is achieved if the maximum service life $t_{max}$ is also always recalculated after the depression of the start button based on currently measured values and is compared with the service life t. It is particularly advantageous to additionally measure the relative humidity of the ambient air and the respiratory minute volume, as a result of which the accuracy of the calculation is further increased and the use of the filter is further optimized.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
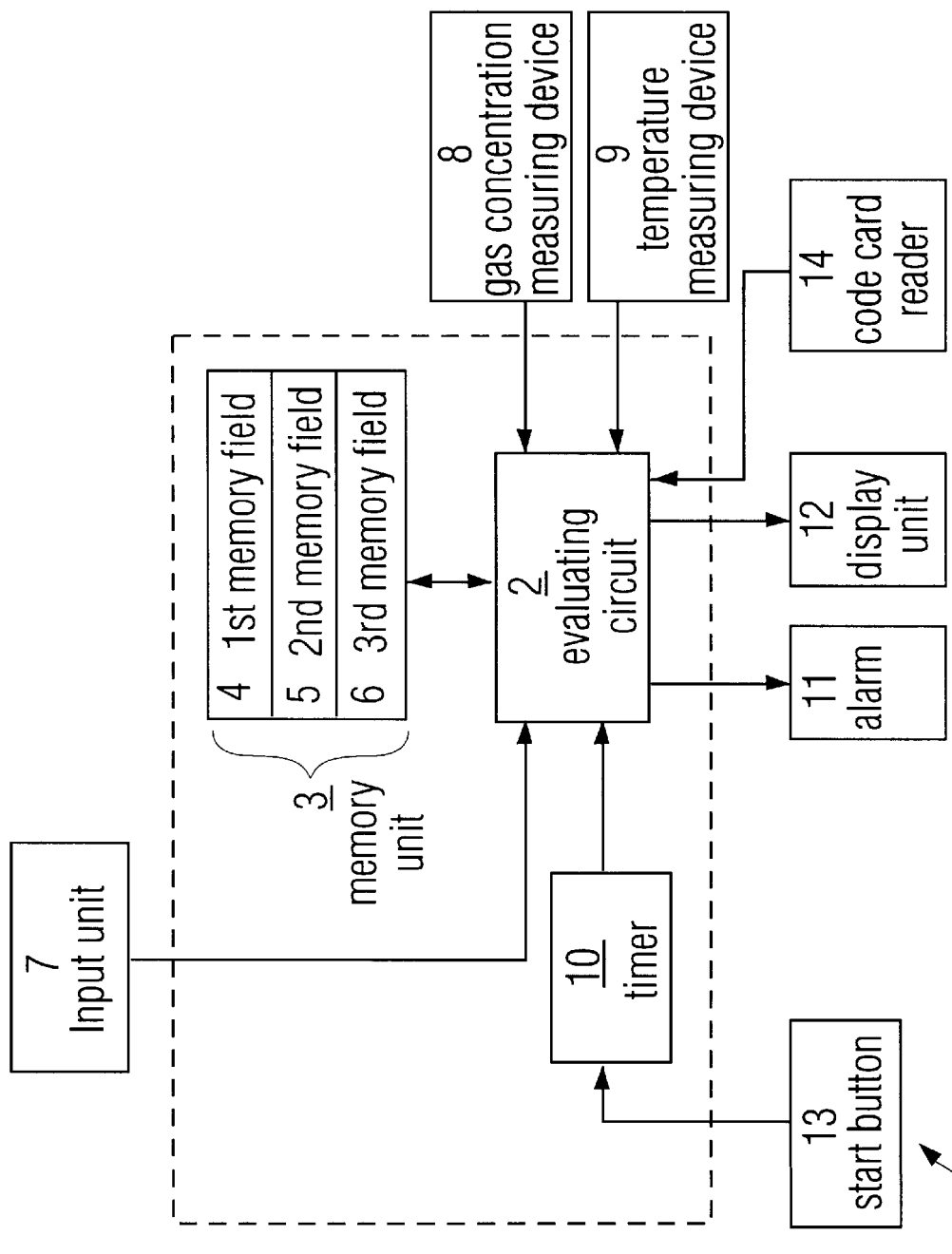
FIG. 1 is a schematic view of a first monitoring device according to the invention.

Referring to the drawings in particular, FIG. 1 schematically shows a first monitoring device 1 for an adsorption filter, not shown in FIG. 1. The first monitoring device comprises an evaluating circuit 2, a memory unit 3 with a first memory field 4, a second memory field 5 and a third memory field 6, an input unit 7, a gas concentration-measuring device 8, a temperature-measuring device 9, a timer 10, an alarm 11, and a display unit 12. Various preset values for the adsorption filter, the toxic substance to be detected and the environmental conditions, which will be used to calculate the exhaustion of the filter, are stored in the memory unit 3. Thus, the first memory field 4 contains individual filter data sets associated with specific adsorption filters, e.g., the type of the filter as well as the type and the amount of the adsorbent. The second memory field 5 contains data sets for the toxic substance, toxic substance-specific constants for the toxic substance to be adsorbed, and the third memory field 6 contains preset values for the ambient air humidity, the respiratory minute volume and the limit value of the remaining capacity, e.g., in % of the total capacity or in minutes of remaining service life, at which the filter exhaustion alarm will be generated. All the calculation operations needed for the determination of the adsorption capacity of the adsorption filter are performed in the evaluating circuit 2, which is provided for this purpose with a microprocessor, not shown in the figure. The timer 10, which indicates the service life t of the adsorption filter, is activated by depressing a start button 13.

The first monitoring device 1 according to the present invention operates as follows:

The data of the filter and of the toxic substance, the limit value of the remaining capacity as well as a preset value each for the ambient air humidity and the respiratory minute volume are first selected with the input unit 7 and read into the evaluating circuit 2. The filter data set to be selected from the first memory field 4 is obtained from the model designation of the adsorption filter used, which can be found on the sticker on the housing of the adsorption filter.

The toxic substance to be adsorbed, e.g., hexane, is subsequently selected with the input unit 7 from the second memory field 5 with the corresponding constants specific of the toxic substance and is taken over into the evaluating circuit 2. After switching over to the third memory field 6, preset values for the ambient air humidity, the respiratory minute volume and the limit value are offered, which are transferred after corresponding selection into the evaluating circuit 2.

The respiratory minute volume to be selected depends on the conditions under which the adsorption filter is used. If the adsorption filter is used, e.g., in the intake flow of a blower filter device, the respiratory minute volume is obtained from the delivery capacity of the blower. In contrast, the respiratory minute volume to be selected depends on the activity being performed by the user of the respirator in the case of an adsorption filter arranged on a respirator. Usual values are between about 12 and 18 L per minute. It may also be considerably higher in the case of special physical stress. The so-called filter retention time, i.e., the maximum service life $t_{max}$, is then first calculated in the evaluating circuit 2 with the preset values selected and the measured values by means of algorithms as described, e.g., in the document G. O. Wood, Estimating Service Lives of Organic Vapor Cartridges, American Industrial Hygiene Association, (55), January 1994, pp. 11–14 for organic solvent vapors. The monitoring device 1 is then prepared for the particular use. It is usually carried in the immediate vicinity of the adsorption filter, e.g., on the breast pocket of a respirator user. After putting the adsorption filter into operation, the timer 10 is first switched on by depressing the start button 13. Mean values of the measured gas concentration values determined with the gas concentration-measuring device and of the ambient temperatures measured with the temperature-measuring device 9 are continuously formed in the evaluating circuit 2. A new, updated maximum service life $t_{max}$ is continuously calculated from these mean values and the preset values selected from the data fields 4, 5, and 6 and compared with the time t already expired, which is supplied by the timer 10. The difference $t_{max}$ minus t shows the remaining service life or remaining capacity of the adsorption filter, which is communicated to the user via a display unit 12.

As soon as the remaining use time becomes shorter than the limit value set, a warning signal is generated by the alarm 11, which prompts the user to leave the hazardous area The selection of the filter data and of the data of the toxic substance from the memory fields 4, 5, and 6 can be simplified by reading device-related data, e.g., the filter data, into the monitoring device 1 by means of a code card, not shown in FIG. 1. A code card reader 14 connected to the evaluating circuit 2 is provided for this purpose. As an alternative, these data may also be read in via a digital interface, not shown in FIG. 1.

Figure 2:
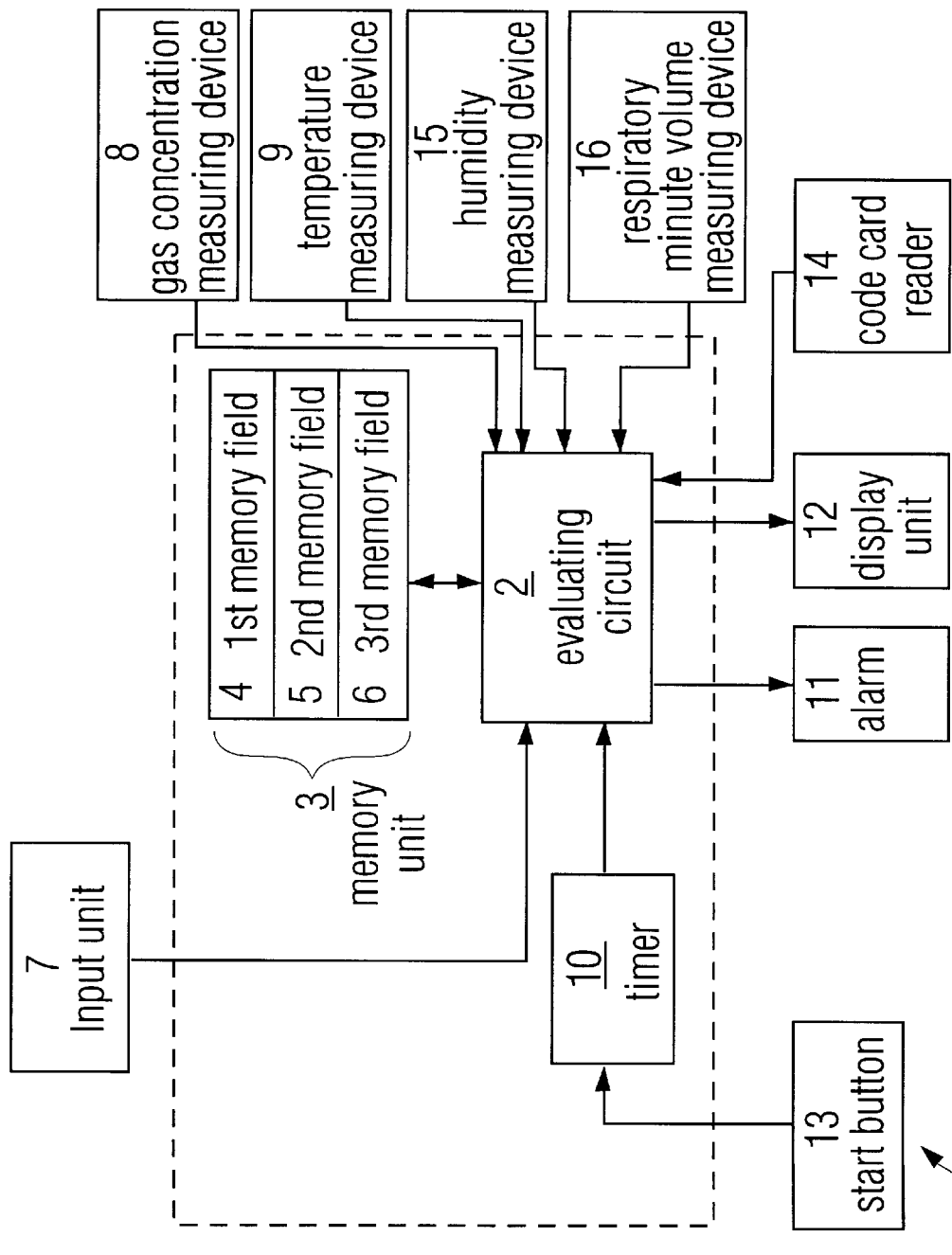
FIG. 2 is a schematic view of a second monitoring device according to the invention.

FIG. 2 schematically shows a second monitoring device 20, in which the relative humidity and the respiratory minute volume are also measured in addition to the toxic substance content and the temperature of the ambient air compared with the first monitoring device 1 according to FIG. 1. To do so, measured values are transmitted to the evaluating circuit 2 from a humidity-measuring device 15 and a respiratory minute volume-measuring device 16. Identical components are designated with the same reference numbers as in FIG. 1. A further improvement of the filter use is achieved compared with the first monitoring device 1 according to FIG. 1 due to the additional measurement of the relative humidity of the ambient air as well as of the respiratory minute volume.

While specific embodiments of the invention have been shown and described in detail to illustrate the application of the principles of the invention, it will be understood that the invention may be embodied otherwise without departing from such principles.

What is claimed is:

1. A device for determining the exhaustion of an adsorption filter for toxic gases in the ambient air, the device comprising:

a gas concentration-measuring device for determining the toxic substance content in the ambient air;

a temperature-measuring device for determining the temperature of the ambient air;

a memory unit with a first memory field, in which filter data sets associated with adsorption filters are stored, with a second memory field, in which data sets for the toxic substance to be adsorbed are contained, and with a third memory field, which contains preset values for the ambient air humidity and the respiratory minute volume, an input unit for selecting the preset values from at least said first memory field, said second memory field and said third memory field;

a timer with a start button, which times a service life t of the adsorption filter;

an evaluating circuit, which determines the maximum service life $t_{max}$ from the selected preset values, the toxic substance content in the ambient air and the temperature of the ambient air and forms a remaining capacity of the adsorption filter from the difference $t_{max}$ minus t; and an indicator for generating a filter exhaustion indication when the remaining capacity is lower than or equal to a preset limit value.

2. A device in accordance with claim 1, wherein a code card reader and/or a PC interface are provide for inputting at least filter data sets.

3. The device for determining the exhaustion of an adsorption filter for toxic gases in the ambient air, the device comprising:

a gas concentration-measuring device for determining the toxic substance content in the ambient air;

a temperature-measuring device for determining the temperature of the ambient air;

a humidity-measuring device for determining the relative humidity of the ambient air;

a respiratory volume-measuring device for determining the volume of ambient air flowing through the adsorption filter per unit of time;

a memory unit with a first memory field, in which filter data sets associated with the adsorption filter are stored, and with a second memory field, in which data sets for the toxic substance to be adsorbed are contained;

an input unit for selecting the preset values from at least said first memory field and said second memory field;

a timer with a start button, for timing a service life t of the adsorption filter;

an evaluating circuit, which determines a maximum service life $t_{max}$ from the preset values selected with said input unit and from the measured values obtained for the toxic substance content in the ambient air, the temperature and the relative humidity of the ambient air and the respiratory minute volume and forms a remaining capacity of the adsorption filter from the difference $t_{max}$ minus t;

an indicator for generating a filter exhaustion indication when the remaining capacity value is lower than or equal to a preset limit value.

4. The device in accordance with claim 3, further comprising a code reader and/or a PC interface for inputting at least filter data sets.

5. A process for determining the exhaustion of an adsorption filter with a device containing a gas concentration-measuring device, a temperature-measuring device, a memory unit with a first memory field, in which filter data sets associated with adsorption filters are stored, with a second memory field, in which data sets for the toxic substance to be adsorbed are stored, and with a third memory field, which contains preset values for the ambient air humidity and the respiratory minute volume, also containing an input unit, a timer with a start button and an evaluating circuit, the process comprising the steps of:

A) selecting filter data preset values from the first memory field, filter data preset values from the second memory field, an ambient air humidity preset value and a respiratory minute volume preset value from a third memory field with the input unit;

b) measuring the toxic substance content in the ambient air with the gas concentration-measuring device and the temperature of the ambient air with the temperature-measuring device;

c) determining a maximum service life $t_{max}$ in the evaluating circuit from the selected preset values according to said step a) and the measured values according to said step b);

d) starting the timer, which provides the service life t of the adsorption filter, with the said start button;

e) forming a remaining capacity of the adsorption filter from the comparison of $t_{max}$ with t; and f) generating a filter exhaustion indication when the remaining capacity is lower than or equal to a preset limit value.

6. The process in accordance with claim 5, wherein said steps b) and c) are also performed continuously after said start button has been depressed.

7. The process in accordance with claim 5, wherein the preset value for the ambient air humidity is determined with a humidity-measuring device.

8. The process in accordance with claims 5, wherein the volume of ambient air flowing through the adsorption filter per unit of time Determined with a said respiratory minute volume-measuring device.

* * * * *